Figure 1:
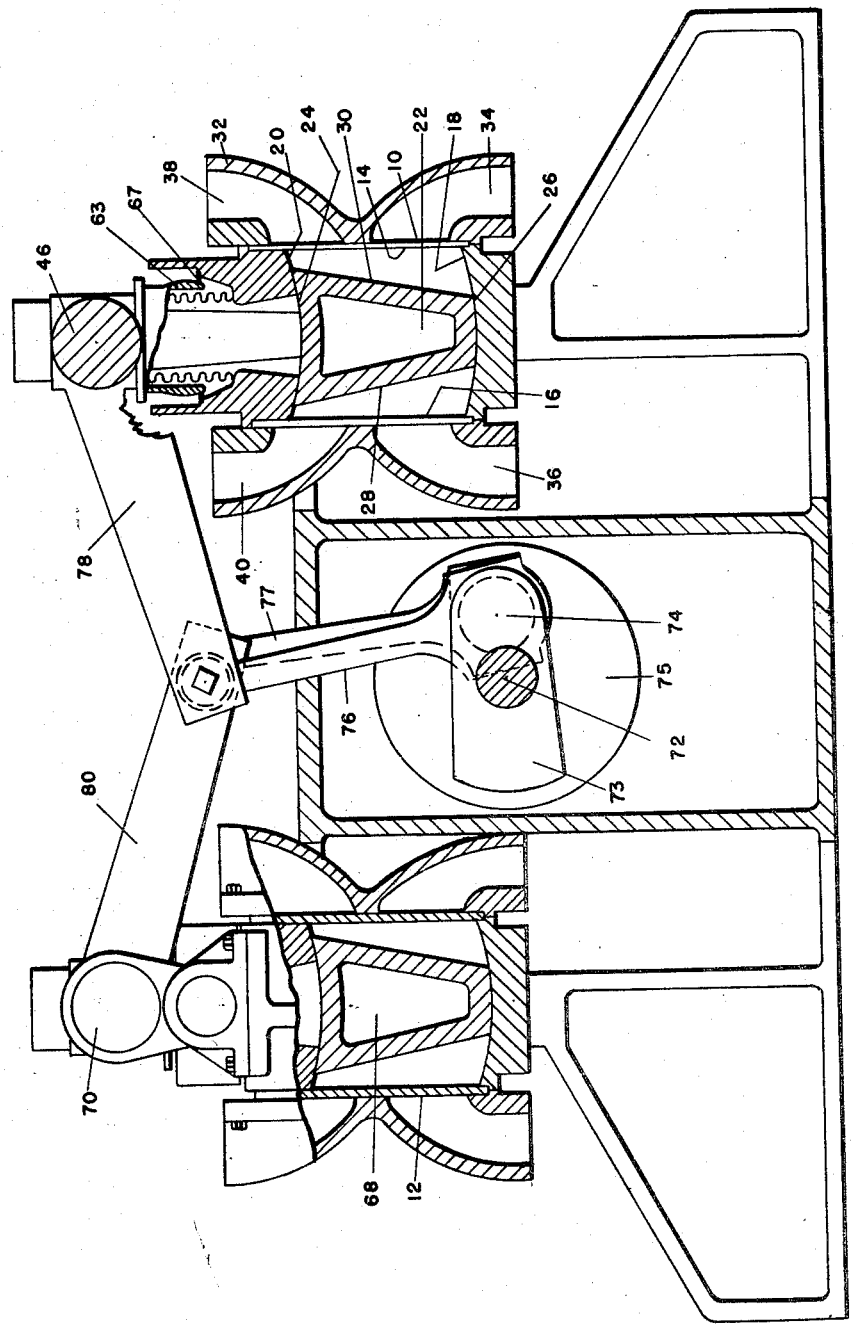

Sept. 23, 1958   N. UNDERWOOD   2,853,228
OSCILLATORY PUMP

Filed May 28, 1945   2 Sheets-Sheet 2

INVENTOR
NEWTON UNDERWOOD
BY
ATTORNEY

United States Patent Office 2,853,228
Patented Sept. 23, 1958

2,853,228
OSCILLATORY PUMP

Newton Underwood, Nashville, Tenn., assignor to the United States of America as represented by the United States Atomic Energy Commission Application May 28, 1945, Serial No. 596,214

11 Claims. (Cl. 230—159)

This invention relates to oscillatory pumps and more particularly to a novel type of oscillatory pump wherein a paddle-type piston oscillates in a pendulum-like manner in a pump casing. The pump of the present invention is particularly well adapted for handling in an efficient manner relatively large volumes of a corrosive gas although as the description proceeds it will become apparent that the pump is not limited to this application but may be more generally used for the pumping of fluids.

In handling highly corrosive gases such as, for example, fluorine or chlorine or their compounds, a number of special problems arise that are not ordinarily encountered in handling non-corrosive fluids. Such gases chemically attack all of the common lubricants and packing materials thereby destroying their lubricating properties. Furthermore the reaction products produced as a result of the chemical interaction between the corrosive gas and the lubricant may contaminate the gas being pumped. It is thus desirable in cases where a lubricant is used that the corrosive gas and lubricant be prevented from coming into contact with one another. In the case of the ordinary reciprocating pump one of the most effective methods to prevent this intermingling of corrosive gas and lubricant is to use a flexible metal seal, for example, a Sylphon bellows, between the moving parts of the pump and the stationary parts of the pump. Such a bellows may be sealed to the cylinder and to the piston or piston rod in such manner that the bellows expands and contracts as the piston moves with respect to the cylinder.

The bellows-sealed reciprocating pump effectively prevents intermixing of the corrosive gas and lubricant but is subject to a number of disadvantages. When a Sylphon bellows is continually expanded and contracted there is a tendency for the bellows to fail because of fatigue. This tendency of the bellows to fail because of fatigue may be minimized by reducing the stroke of the pump and thus the movement of the bellows, provided that the desired capacity of the pump is relatively small. However this type of pump is not very satisfactory for handling large volumes of gas because of the fact that in reciprocating pumps of large capacity a relatively long stroke is a practical necessity.

It is accordingly an object of the present invention to provide a pump adapted to handle relatively large volumes of a corrosive gas.

It is another object of the invention to provide a pump capable of operating without any lubricant or packing in contact with the fluid being pumped.

It is still another object of the invention to provide a bellows-sealed pump so constructed and arranged as to minimize the movement of the bellows and thereby prolong its effective life.

Other objects of the invention will be in part obvious and in part pointed out hereinafter.

Figure 2:
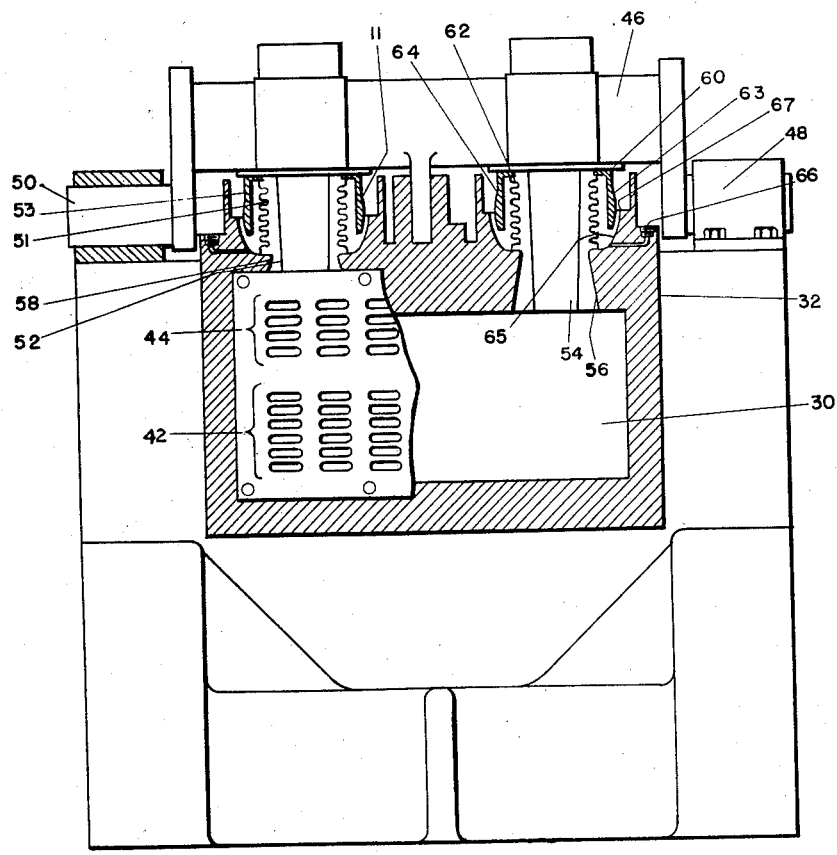

The many objects and advantages of the present invention may best be understood by reference to the accompanying drawings which illustrate a two-cylinder double-acting paddle type pump incorporating a preferred embodiment of the present invention and wherein Fig. 1 is a vertical section through the pump showing the arrangement of the two paddle type pistons within the cylinders and the mechanism for driving the pistons, and Fig. 2 is an end view of the pump, partly in section to show the piston supporting structure and the valve ports.

Referring to the drawings and more particularly to Fig. 1 there is shown in this figure a two-cylinder pump having the similarly constructed cylinders 10 and 12. The cylinder 10 is essentially defined by a pair of straight parallel side walls 14 and 16, a slightly concave bottom wall 18 and a correspondingly convex upper wall 20. Mounted for pendulous oscillation within the cylinder 10 there is a hollow paddle type piston 22 of approximately truncated prismatic form. The piston 22 is essentially defined by a pair of parallel upper and lower faces 24 and 26 which are curved to conform to the upper convex wall 20 and the lower concave wall 18 of the cylinder 10 respectively, and a pair of non-parallel faces 28 and 30. The non-parallel faces 28 and 30 are arranged at such an angle that when the piston 22 is at the left end of its stroke as shown in Fig. 1 the face 28 of the piston is substantially parallel to the wall 16 of cylinder 10 and when the piston is at the right hand end of its stroke as shown in Fig. 1 the face 30 of the piston is substantially parallel to the wall 14 of the cylinder 10. The clearances between piston face 26 and cylinder wall 18 and between piston face 24 and cyinder wall 20 are made relatively small to minimize gas leakage past the piston.

The cylinder 10 is located in a casing 32 having formed therein the inlet conduits 34 and 36 leading into opposite sides of the cylinder 10 and the outlet conduits 38 and 40 leading from opposite sides of the cylinder 10. The cylinder walls 14 and 16 are provided (see Fig. 2) with the intake valves 42 and the discharge valves 44 which may be of the reed or flutter type. The piston 22 is double-acting and thus when it moves to the left as shown in Fig. 1 gas is drawn through conduit 34 and intake valves 42 into the cylinder 10 and simultaneously another portion of gas is discharged through conduit 40 whereas when the piston moves to the right as shown in Fig. 1 gas is drawn from intake conduit 36 into the cylinder and at the same time gas is forced through discharge valves 44 into the conduit 38.

The manner in which the piston 22 is mounted for pendulous oscillation within the cylinder 10 is best shown in Fig. 2. Referring to Fig. 2 a rocker shaft 46 is provided which is mounted on the top of the pump casing in the journal bearings 48 and 50 but eccentric thereto in such manner that the rocker shaft 46 is adapted to move in an arcuate path around the center line of the bearings 48 and 50. The piston 22 is mounted on the rocker shaft 46 and in fixed relation thereto by means of two piston supporting members 52 and 54 which extend through openings 56 and 58 ni the pump casing.

In order to seal the pump casing and prevent leakage from the cylinder a flexible seal is provided between the rocker shaft 46 and the casing 32. Mounted on the piston supporting member 54 there is a collar 60 to which is sealed one end of a bellows 62, the other end of the bellows being sealed to the pump casing 32 in such manner as to provide a hermetical seal for the cylinder. The bellows 62 is so mounted that its center is approximately on the center line of the journal bearings 48 and 50 and thus as the piston oscillates the bellows is required to move only a minimum amount.

It has been found that the life of the bellows may be extended if the pressure difference between the inside and outside of the bellows is maintained as small as possible and accordingly a housing generally indicated by the numeral 63 is provided for maintaining the pressure outside the bellows seal at a controlled value that may be adjusted to approximate the average pressure within the bellows. The housing 63 encloses bellows 62 and comprises a depending flange 64 of the collar 60 and a cooperating bowl-shaped recess 65 in the casing 32. The outer surface of flange 64 is curved to conform with the inner surface of recess 65 and at the upper periphery of recess 65 there is a sealing ring 67 which bears against the outer surface of flange 64 with a sliding fit that is sufficiently gas tight to permit the maintenance of the desired controlled pressure within the housing as the piston oscillates. A suitable gas such as nitrogen or air may be admitted to the housing 63 through pipe 66 to maintain the pressure between the housing and bellows 62 approximately equal to the average pressure within the bellows 62. In cases where the pump operates at pressures below atmospheric pressure the space between the housing and bellows may be evacuated through pipe 66 to obtain the desired minimum average pressure difference across the bellows.

The piston supporting member 52 is embraced by a bellows 51 mounted in a housing 53 similar to the bellows 62 and housing 64 respectively and therefore need not be separately described. Similarly (referring again to Fig. 1) the cylinder 12 contains a piston 68 which is constructed like piston 22 and similarly mounted on a rocker shaft 70 corresponding to the rocker shaft 46. The rocker shafts 46 and 70 are operated by a drive shaft 72 which is rotated by any suitable prime mover such as, for example, an electric motor (not shown). Mounted on shaft 72 there is a crank 74 which is connected by the pitmans 76 and 77 and connecting rods 78 and 80 with the rocker shafts 46 and 70 respectively to cause the rocker shafts to oscillate as the drive shaft rotates. The shaft 72 is provided with a comparatively heavy counterweight 73 and flywheel 75 to ensure stable operation.

The operation of the present pump is apparent from the above description. As the drive shaft 72 is rotated the rocker shafts 46 and 70 are rocked through a small angle, the center of oscillation being the center line of the journal bearings 48 and 50. The paddle-type pistons 22 and 68, being fixed to the rocker shafts 46 and 70, are oscillated in a corresponding manner within the cylinders 10 and 12 to pump gas through the cylinders in the manner described above. Since the centers of the bellows seals are approximately on the center of oscillation there will be relatively little movement of the bellows. Furthermore the housings around the bellows permit maintenance of such pressures in the space between the housing and bellows as to minimize the pressure drop across the bellows. These two factors, the relatively small motion of the bellows and the relatively small pressure drop across the bellows combine to prolong substantially the effective life of the bellows.

The speed of oscillation of the pump described above does not appear to be particularly critical. Satisfactory efficiencies have been obtained with such a pump when pumping volumes of the order of 300 cubic feet per minute at speeds of the order of 700 to 1000 oscillations per minute.

Since many embodiments might be made of the present invention and since many changes might be made in the embodiment described above, it is to be understood that the foregoing description is to be interpreted as illustrative only and not in a limiting sense.

I claim:

1. An oscillatory pump comprising in combination a pump casing having inlet and outlet means, a paddle piston oscillatory in an arcuate path within said casing, supporting means for pivotally supporting said piston within said casing, the pivotal support for said supporting means being located outside said casing, means for rocking said supporting means to cause said piston to oscillate within said casing, and flexible sealing means interconnecting said supporting means and said casing for sealing said casing as said piston oscillates.

2. An oscillatory pump comprising in combination a pump casing having inlet and outlet means, a paddle piston oscillatory in an arcuate path within said casing, a rocker shaft pivotally supported outside said casing, a supporting member fixed to said rocker shaft and to said piston and extending through said casing, driving means for rocking said rocker shaft to cause said piston to oscillate within said casing, and flexible sealing means interconnecting said member and said casing to seal said casing as said piston oscillates.

3. An oscillatory pump comprising in combination a pump casing having inlet and outlet means, a paddle piston oscillatory in an arcuate path within said casing, a rocker shaft provided at its ends with journal bearings mounted on said casing, a piston supporting member extending through said casing and interconnecting said rocker shaft and said piston, driving means for rocking said rocker shaft to cause said piston to oscillate within said casing, and a flexible metal bellows sealed to said member and to said casing to seal said casing as said piston oscillates.

4. An oscillatory pump comprising in combination a pump casing having inlet and outlet means, a paddle piston oscillatory in an arcuate path within said casing, a rocker shaft pivotally mounted outside said casing, a piston supporting member extending through said casing and interconnecting said rocker shaft and said piston, means for rocking said rocker shaft to cause said piston to oscillate within said cylinder, and a flexible metal bellows interconnecting said member and said casing, the ends of said bellows being on opposite sides of the axis of rotation of said rocker shaft.

5. An oscillatory pump comprising in combination a pump casing having inlet and outlet means, a paddle piston oscillatory in an arcuate path within said casing, a rocker shaft pivotally mounted outside said casing, a piston supporting member extending through said casing and interconnecting said rocker shaft and said piston, means for rocking said rocker shaft to cause said piston to oscillate within said cylinder, and a flexible metal bellows interconnecting said member and said casing, the center of said bellows being approximately on the axis of rotation of said rocker shaft.

6. An oscillatory pump comprising in combination a pump casing having inlet and outlet means, a paddle piston oscillatory in an arcuate path within said casing, a rocker shaft pivotally mounted at its ends on said casing, means for rocking said rocker shaft, a piston supporting member extending through said casing and interconnecting said rocker shaft and said piston, a flexible metal bellows interconnecting said member and said casing, a housing for said bellows, and means for controlling the pressure in said housing to maintain the average pressure outside the bellows substantially equal to the pressure within said bellows.

7. An oscillatory pump comprising in combination a pump casing having inlet and outlet means, a paddle piston oscillatory in an arcuate path within said casing, a U-shaped rocker shaft pivotally mounted at its ends on said casing, a pair of piston supporting members extending through said casing and interconnecting said rocker shaft and said piston, each of said members being provided with a flexible seal interconnecting said member with said casing, and means for rocking said rocker shaft to cause said piston to oscillate within said casing.

8. An oscillatory pump for pumping a fluid comprising, in combination, a cylinder having a pair of spaced flat parallel walls, a paddle piston mounted for oscillation within said cylinder, said piston having a pair of angularly related sides adapted to cooperate with said parallel walls to pump said fluid, inlet and outlet valves formed in at least one of said parallel walls, and means for oscillating said piston within said cylinder to pump said fluid through said cylinder.

9. An oscillatory pump for pumping a fluid comprising, in combination, a cylinder having a pair of spaced flat parallel walls, a paddle piston mounted for oscillation within said cylinder, said piston having a pair of angularly related sides, the angle between said sides being such that when said piston is at one end of its stroke the side of said piston adjacent said cylinder wall is substantially parallel to said wall, inlet and outlet valves formed in at least one of said parallel walls, and means for oscillating said piston within said cylinder to pump said fluid through said cylinder.

10. An oscillatory pump for pumping a fluid comprising, in combination, a cylinder having a pair of spaced flat parallel walls, a paddle piston mounted for oscillation within said cylinder, said piston being of approximately truncated prismatic configuration and having non-parallel sides adapted to cooperate with said parallel walls to pump said fluid, inlet and outlet valves formed in each of said parallel walls, and means for oscillating said piston within said cylinder to pump said fluid through said cylinder.

11. An oscillatory pump for pumping a fluid comprising, in combination, a cylinder, a paddle piston mounted for oscillation within said cylinder, said cylinder being essentially defined by a pair of spaced flat parallel walls and a pair of curved parallel walls, said piston being essentially defined by a pair of opposite non-parallel sides and a pair of opposite parallel sides curved to conform with the curved walls of said cylinder, each of the parallel walls of said cylinder being provided with inlet and outlet valves, and means for oscillating said piston within said cylinder to pump said fluid through said cylinder.

References Cited in the file of this patent

UNITED STATES PATENTS

| | | |
|---|---|---|
| 1,719,825 | Murray | July 9, 1929 |
| 2,324,023 | Rappl et al. | July 13, 1943 |